(12) United States Patent
Sakakibara

(10) Patent No.: US 11,993,159 B2
(45) Date of Patent: May 28, 2024

(54) CONTACTLESS CHARGING SYSTEM FOR AN ELECTRIC VEHICLE WITH TARGET CHARGE AMOUNT ACCORDING TO DAY-OF-WEEK

(71) Applicant: HONDA MOTOR CO., LTD., Tokyo (JP)

(72) Inventor: Naoya Sakakibara, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 423 days.

(21) Appl. No.: 17/216,638

(22) Filed: Mar. 29, 2021

(65) Prior Publication Data

US 2021/0300191 A1 Sep. 30, 2021

(30) Foreign Application Priority Data

Mar. 30, 2020 (JP) .................................. 2020-059364

(51) Int. Cl.
| | |
|---|---|
| B60L 53/12 | (2019.01) |
| B60L 53/30 | (2019.01) |
| B60L 53/62 | (2019.01) |
| B60L 53/66 | (2019.01) |

(52) U.S. Cl.
CPC ............. *B60L 53/12* (2019.02); *B60L 53/305* (2019.02); *B60L 53/62* (2019.02); *B60L 53/66* (2019.02)

(58) Field of Classification Search
CPC ........ B60L 53/12; B60L 53/305; B60L 53/62; B60L 53/66
See application file for complete search history.

(56) References Cited

U.S. PATENT DOCUMENTS

| 2003/0052647 A1 | 3/2003 | Yoshida et al. |
| 2011/0191265 A1* | 8/2011 | Lowenthal ............. B60L 53/65 |
| | | 705/412 |
| 2012/0053742 A1* | 3/2012 | Tsuda ..................... B60L 53/63 |
| | | 320/134 |

(Continued)

FOREIGN PATENT DOCUMENTS

| JP | 2012228005 A | 11/2012 |
| JP | 5693856 B2 | 4/2015 |

OTHER PUBLICATIONS

Office Action issued in the CN Patent Application No. 202110341783. X, mailed on Apr. 19, 2024.

*Primary Examiner* — David V Henze-Gongola
(74) *Attorney, Agent, or Firm* — CKC & Partners Co., LLC (57) ABSTRACT

A contactless charging system (1) sends electrical power to charge a battery (4) equipped to a vehicle (3). A contactless charging device (2) includes: a wireless communication device (16) which acquires travel information and use information; a target setting unit (15) which creates a charging plan including the target SOC of the battery (4), based on the information; and a charge control unit (14) which controls the sending of electrical power for battery charging based on the target SOC. The target setting unit (15) divides the average travel distance and average charge rate decrease amount into seven day of week divisions of whole day units, classifies each day of week division into the plurality of a long distance group and a short distance group based on the average travel distance, and creates a target SOC based on the average charge rate decrease amount included in each group.

2 Claims, 5 Drawing Sheets

(56) References Cited

U.S. PATENT DOCUMENTS

2015/0283912 A1* 10/2015 Shimizu ................. B60L 55/00
                                                         320/157
2021/0291694 A1*  9/2021 Shaaban ................ B60L 53/67

* cited by examiner

FIG. 5

CONTACTLESS CHARGING SYSTEM FOR AN ELECTRIC VEHICLE WITH TARGET CHARGE AMOUNT ACCORDING TO DAY-OF-WEEK This application is based on and claims the benefit of priority from Japanese Patent Application No. 2020-059364, filed on 30 Mar. 2020, the content of which is incorporated herein by reference.

BACKGROUND OF THE INVENTION

Field of the Invention

The present invention relates to a contactless charging system. In more detail, it relates to a contactless charging system which charges a battery equipped to a vehicle by non-contact power supply.

Related Art

Conventionally, technology has been proposed which charges a battery by contactless charging to a vehicle which travels by the electrical power of the battery. By the use of data communication by wireless communication between the vehicle and charging device in such contactless charging, by simply parking the vehicle in a parking space equipped with the charging device, since it is possible to start charging of the battery, it is convenient for the user.

Regardless the contactless charging of such a vehicle, Patent Document 1 discloses a configuration which accepts a usage reservation of the charging device by providing a power supply plug which recommends to the charging device installation location from the arrival estimated time and length of stay.

Patent Document 1: Japanese Patent No. 5693856

SUMMARY OF THE INVENTION

However, from the viewpoint of preventing degradation, it is desired for the battery charged with the electrical power for travel to be appropriately charged without fully charging unnecessarily. However, with contactless charging, since it is possible to charging by simply parking the vehicle, there is concern over fully charging the battery unnecessarily, whereby the battery deteriorates.

The present invention has an object of providing a contactless charging system which can suppress degradation of a battery, without causing the convenience of the user to decline.

A contactless charging system (for example, the contactless charging system 1 described later) according to a first aspect of the present invention sends electrical power for battery charging by non-contact to charge a battery (for example, the vehicle 3 described later) by way of the electrical power for battery charging, the system including: an information acquisition unit (for example, the wireless communication device 16 and communication terminal 17 described later) which acquires at least any of travel information of the vehicle and use information of the battery; a target setting unit (for example, the target setting unit 15 described later) which sets target charge amount of the battery based on information acquired by the information acquisition unit; and charge control unit (for example, the charge control unit 14 described later) which controls sending of the electrical power for battery charging based on the target charge amount.

According to a second aspect of the present invention, in this case, it is preferable for the information acquisition unit to acquire the travel information and the use information; and the target setting unit to: divide the travel information and the use information into a plurality of divisions of whole day units, classify the plurality of divisions based on the travel information into a plurality of groups, and set the target charge amount based on the use information included in each group.

According to a third aspect of the present invention, in this case, it is preferable for the target setting unit to set the target charge amount based on the use information included in a group to which a new use predicted day of the vehicle belongs.

According to a fourth aspect of the present invention, in this case, it is preferable for the information acquisition unit to acquire management information of the battery via a network (for example, the network N described later) from a server (for example, the management server 8 described later) which manages a usage condition of the battery, and the target setting unit to set the target charge amount based on the travel information, the use information and the management information.

In the first aspect the present invention, the information acquisition unit at least any of travel information of the vehicle and use information of the battery equipped to this vehicle. It is thereby possible to grasp the usage condition of the vehicle and battery by the user, and movement pattern. In addition, the target setting unit sets the target charge rate of the battery based on the information acquired by the information acquisition unit, and the charge control unit controls sending of electrical power for battery charging based on the set target charge rate. Therefore, according to the present invention, since it is possible to charge battery by the required amount suited to the usage conditions of the vehicle and battery by the user and the movement pattern by setting the target charge rate based on at least any of the travel information of the vehicle and usage condition of the battery, it can be configured so as to not fully charge the battery unnecessarily. Consequently, according to the present invention, it is possible to suppress degradation of the battery without causing the convenience of the user to decline.

In the second aspect of the present invention, the information acquisition unit acquires both the travel information of the vehicle and usage condition of the battery, the target setting unit divides the acquired travel information and use information into a plurality of divisions (for example, day of week divisions) of whole day units, further classifies this plurality of divisions into a plurality of groups based on the travel information, and sets the target charge amount based on the use information included in each group. For example, when considering an exemplary movement pattern of the user, weekdays have a tendency for the travel distance to be short due to using the vehicle in commuting, and holidays have a tendency for the travel distance to be long due to using the vehicle to go out to a remote location. According to the present invention, by classifying a plurality of divisions into a plurality of groups based on the travel information, and then setting the target charge amount based on the usage condition included in each group, since it is possible to charge the battery by the required amount suited to the movement pattern of the user, it is configured so as not to fully charge the batter unnecessarily, and it is possible to suppress degradation of the battery without causing the convenience of the user to decline.

In the third aspect of the present invention, the target setting unit sets the target charge amount based on the use information included in the group to which the next use predicted day of the vehicle belongs. On the day on which the user actually uses the vehicle, since it is thereby possible to charge the battery by an amount required on this day, it can be configured so as not to fully charge the battery unnecessarily, and suppress degradation of the battery, without causing the convenience of the user to decline.

In the fourth aspect of the present invention, the information of acquisition unit acquires the management information of the battery via the network from the server managing the usage condition of the battery, and the target setting unit sets the target charge amount based on the travel information of the vehicle, use information of the battery, and management information of the battery from the server. Information which cannot be acquired from the use information is included in the management information of the battery, as in the history related to the charging of the battery other than at home, for example. Consequently, according to the present invention, by setting the target charge amount based on these three sets of information, it is possible to accurately grasp the usage condition of the battery of the vehicle by the user and the movement pattern, and thus appropriately set the target charge amount. Consequently, according to the present invention, it is possible to suppress degradation of the battery without causing the convenience of the user to decline.

DETAILED DESCRIPTION OF THE INVENTION

Hereinafter, a contactless charging system according to an embodiment of the present invention will be explained while referencing the drawings.

Figure 1:
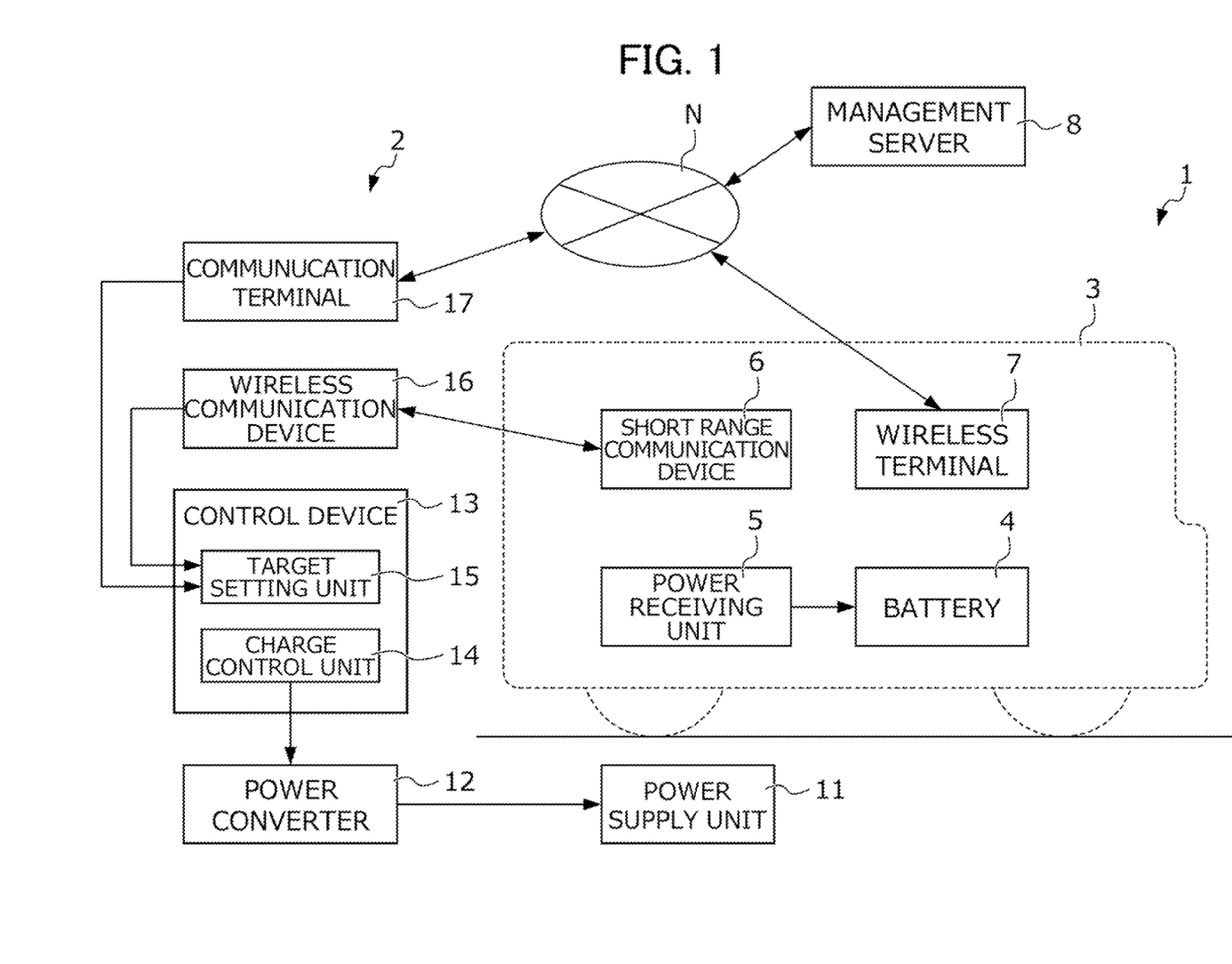
FIG. 1 is a block diagram showing a contactless charging system according to an embodiment of the present invention.

FIG. 1 is a block diagram showing a contactless charging system 1 according to the present embodiment. This contactless charging system 1 includes: a vehicle 3 equipped with a battery 4, and a contactless charging device 2 provided to a parking space of this vehicle 3, and charges the battery 4 while the vehicle 3 is parked in the parking space.

The vehicle 3 is an electric vehicle which charges the battery 4 by way of electrical power for battery charging supplied by non-contact from the contactless charging device 2, and travels by way of the electrical power of this battery 4. The vehicle 3 includes the battery 4, a power receiving unit 5 connected to this battery 4, a short-range communication device 6, and a wireless terminal 7.

The battery 4 can widely apply secondary batteries, capacitors, etc. capable of charging/discharging electrical power by which the vehicle 3 can travel, such as a lithium-ion secondary battery or nickel hydride secondary battery.

The power receiving unit 5 is a part which receives the electrical power for battery charging supplied by non-contact from the power supply unit 11 of the contactless charging device 2 to charge the battery 4, and includes a power receiving coil that receives the electrical power for battery charging, a rectifying circuit which rectifies the output of this power receiving coil, a charge/discharge control circuit which controls the charging/discharging of the battery 4, a recording unit which records the history of charging/discharging, etc.

The short-range communication device 6 performs data communication with a wireless communication device 16 existing within the wireless communication range in the vicinity thereof, by way of Wi-Fi (registered trademark), for example. The short-range communication device 6 determines the presence/absence of the wireless communication device 16 within the wireless communication range, by scanning a predetermined frequency band at a predetermined cycle. The short-range communication device 6 sends vehicle travel information and battery use information to the wireless communication device 16, after the vehicle 3 is parked in the parking space, and data communication with the wireless communication device 16 becomes possible through predetermined authentication processing.

Herein, information which can grasp the movement pattern of the user using the vehicle 3, i.e. information related to the travel distance of the vehicle 3, information related to the travel route of the vehicle 3, information related to the parking position of the vehicle 3, etc., is included in the vehicle travel information. In addition, information related to the change in charge rate of the battery 4 (hereinafter terminology of "SOC (State of Charge)" is used), information related to the degradation degree of the battery 4, information related to the temperature of the battery 4, etc. are included in the battery use information.

The wireless terminal 7 is connected to be able to communicate with a management server 8 which manages the usage condition of the battery 4 via a network N. The wireless terminal 7 sends information related to the usage condition of the battery 4 (for example, information related to history of SOC of the battery 4, information related to temperature of battery 4, information related to degradation degree of battery 4, history of charging at home of battery 4, history of charging by charging equipment other than home of battery 4, etc.) during travel of the vehicle 3 to the management server 8 via network N.

The contactless charging device 2 is provided to the parking space which is regularly used by the user of the vehicle 3. Hereinafter, a case of the contactless charging device 2 provided at the parking space of the home of the user of the vehicle 3 will by explained; however, the present invention is not to be limited thereto. The contactless charging device 2 may be provided to a parking space regularly used by the user.

The contactless charging device 2 includes: a power supply unit 11 including a power supply coil that sends electrical power; a power converter 12 which converts alternating current power for home (not shown) into transmission electrical power and supplies to the power supply unit 11; a control device 13 which operates the power converter 12 and causes charging electrical power of the battery 4 to be sent from the power supply unit 11; a wireless communication device 16 which performs wireless communication with the short-range communication device 6 equipped to the vehicle 3; and the communication terminal 17 which can communicate with the management server 8 via the network N.

The power supply unit 11 is installed in the road surface of the parking space. More specifically, the power supply unit 11 is provided at a position facing and close to the power receiving coil provided to the vehicle 3 parked in the parking space. The control device 13 operates the power converter 12 to cause the electrical power for charging of the battery 4 to be sent from the power supply unit 11, in response to the vehicle 3 being alignment parked in the parking space. Herein, alignment parking refers to stopping the vehicle 3 within the parking space so that a power receiving unit 5 provided to the vehicle 3 faces the power supply unit 11.

The wireless communication device 16 performs data communication with the short-range communication device 6 existing within the wireless communication range in the vicinity thereof, by way of Wi-Fi (registered trademark), for example. The wireless communication device 16 acquires the vehicle travel information and battery use information sent from the short-range communication device 6 via this data communication, after data communication becomes possible with the short-range communication device 6 through predetermined authentication processing. The wireless communication device 16 sends the acquired vehicle travel information and battery use information to the control device 13. It should be noted that, hereinafter, a case of the wireless communication device 16 acquiring both the vehicle travel information and battery use information is explained; however, the present invention is not to be limited thereto. The wireless communication device 16 may be configured so as to acquire at least either of this vehicle travel information and battery use information.

The communication terminal 17 acquires the battery management information of the battery 4 from the management server 8 via the network N. Information related to the history of the SOC of the battery 4, information related to the temperature of the battery 4, information related to the degradation degree of the battery 4, history of the charging at home of the battery 4, history of charging by charging equipment other than home of the battery 4, etc. are included in this battery management information, as mentioned above. The communication terminal 17 sends the acquired battery management information to the control device 13.

The control device 13 is a computer which controls the sending of electrical power for battery charging from the power supply unit 11, and forms functional blocks of a charge control unit 14 and target setting unit 15, by executing predetermined control programs.

The target setting unit 15 creates a charging plan of the battery 4 of the vehicle 3 based on the vehicle travel information and battery use information sent from the wireless communication device 16, as well as the battery management information sent from the communication terminal 17, and sends this charging plan to the charge control unit 14. Herein, charging plan of the battery 4 is a table deciding the target SOC of the battery 4 upon charging the battery 4 by the contactless charging device 2 at every start date of the contactless charging (for example, refer to FIG. 4 described later).

According to the contactless charging device 2, since the user can charge the battery 4 by simply alignment parking the vehicle 3 in the parking space in the above way, it is convenient for the user. In addiction, if only considering the convenient of the user, it can be said as preferable for the contactless charging device 2 to always fully charge the battery 4, in the case of the vehicle 3 being alignment parked in the parking space. However, when charging until the battery 4 becomes fully charged, there is concern over accelerating the degradation of the battery 4.

Therefore, upon grasping the usage condition of the vehicle 3 and battery by the user, and the movement pattern of the user using the vehicle 3, based on the vehicle travel information, battery use information and battery management information, the target setting unit 15 creates the charging plan according to the usage condition and movement pattern, so as not to fully charge the battery 4 unnecessarily and so as not to fall into a state where the battery 4 is insufficient charge during use of the vehicle 3 by the user.

The charge control unit 14 operates the power converter 12 to cause electrical power for charging of the battery 4 to be sent from the power supply unit 11, in response to the vehicle 3 paired with the power supply unit 11 through authentication processing using the wireless communication device 16 being alignment parked in the parking space. Herein, the charge control unit 14, in the case of the charging plan being created by the target setting unit 15, controls the sending of electrical power for charging from the power supply unit 11 based on the target SOC decided by this charging plan.

Figure 2:
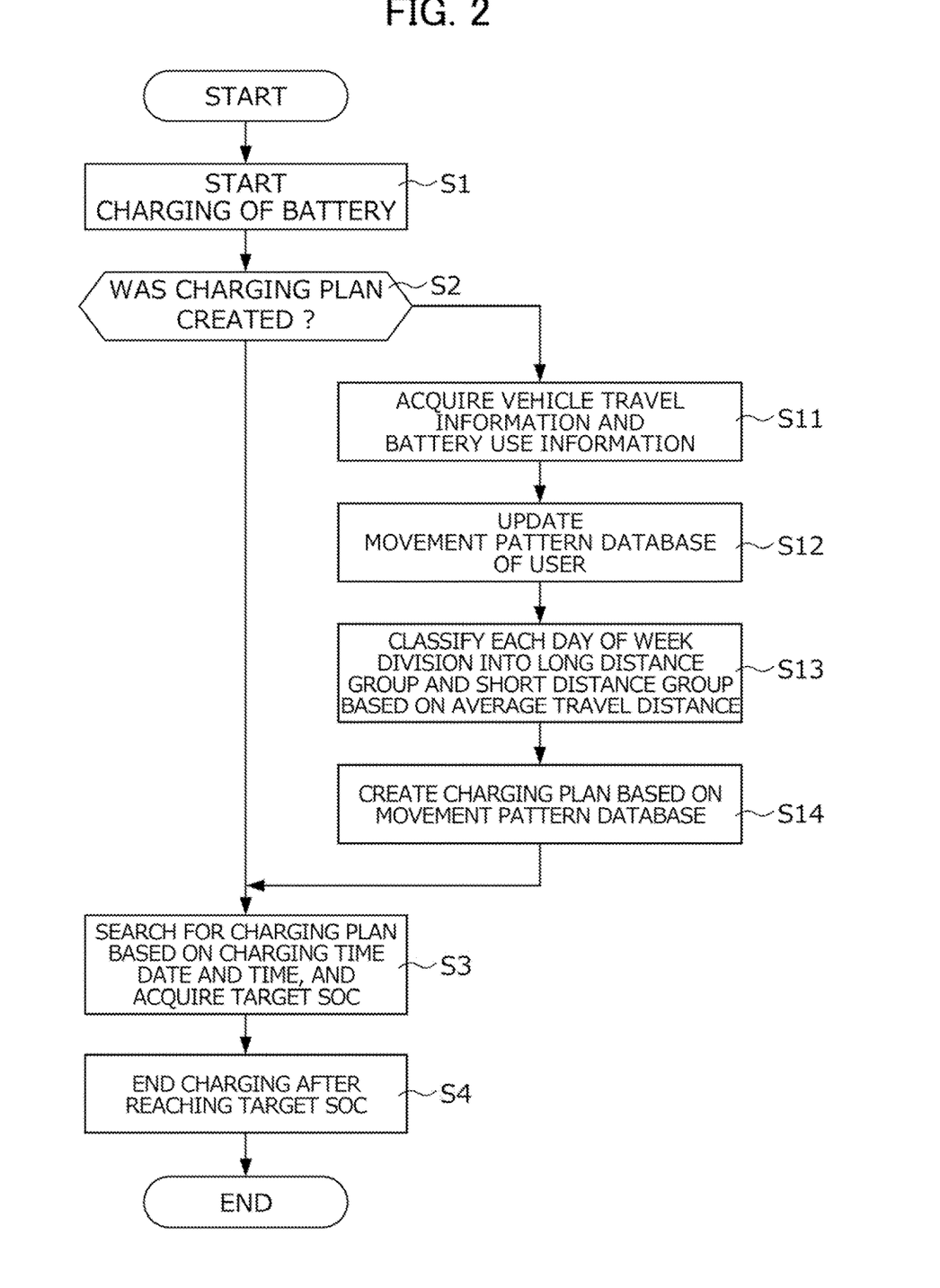
FIG. 2 is a flowchart showing a sequence of charging of a battery 4 by a contactless charging device.

FIG. 2 is a flowchart showing a sequence of charging of the battery 4 by the contactless charging device 2. The processing shown in FIG. 2 is executed by the control device 13 in response to the vehicle 3 being alignment parked in the parking space, and data communication between the wireless communication device 16 and short-range communication device 6, as well as the sending of electrical power to the power receiving unit 5 from the power supply unit 11 becoming possible.

First, in step S1, the charge control unit 14 operates the power converter 12, and starts charging of the battery 4. Next, in step S2, the charge control unit 14 determines whether the charging plan has already been created by the target setting unit 15. The charge control unit 14 advances to step S3, in the case of the determination result in step S2 being YES.

In step S3, the charge control unit 14 acquires the target SOC of the battery 4, by searching the charging plan (refer to FIG. 4 described later) created by the target setting unit 15, based on the present date and time, i.e., current charging start date and time. In step S4, the charge control unit 14 continues charging of the battery 4 until the SOC of the battery 4 reaches the target SOC, and stops charging in response to reaching the target SOC.

In the case of the determination result of step S2 being NO, the target setting unit 15 creates the charging plan in accordance with the sequence explained below.

First, in step S11, the target setting unit 15 acquires the vehicle travel information and battery use information sent from the side of the vehicle 3. In step S12, the target setting unit 15 divides the acquired vehicle travel information and battery use information into a plurality of divisions of whole day units, and updates the movement pattern database of the user.

Figure 3:
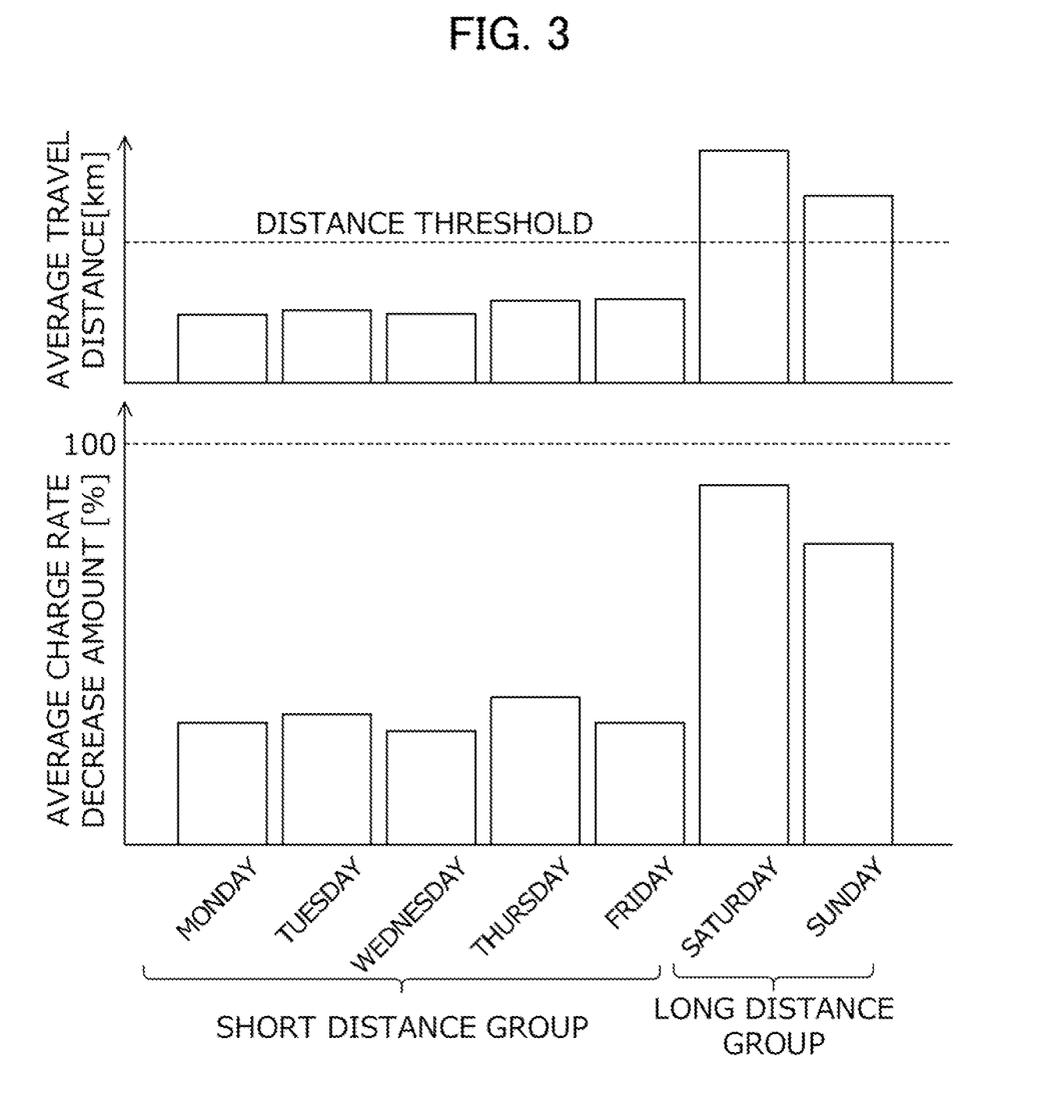
FIG. 3 is a view showing an example of a movement pattern database.

FIG. 3 is a view showing an example of the movement pattern database. The average charge rate decrease amount and average travel distance are stored for each of the plurality of divisions of whole day units in the movement pattern database. The present embodiment explains a case of constructing a movement pattern database in seven days of the week divisions as shown in FIG. 3; however, the present invention is not to be limited thereto. The movement pattern database can be constructed in calendar divisions.

Herein, average charge rate decrease amount is the average value for every day of the week for the decrease amount of battery SOC per day. Herein, decrease amount of battery SOC per day is an amount obtained by subtracting the battery SOC at the charging end time of the previous day of the contactless charging device 2, for example. In addition, average travel distance is an average value for every day of the week for the travel distance of the vehicle 3 per day. Herein, travel distance per day is the interval travel distance from the charging start time of the previous day of the contactless charging device 2 until the charging start time of the next day.

Next, in step S13, the target setting unit 15 classifies each day of the week division into plurality of groups, based on the average travel distance of the movement pattern database after updated. More specifically, the target setting unit 15 classifies the day of week divisions having an average travel distance no more than a predetermined distance threshold into a short distance group, and classifies day of the week divisions having an average travel distance longer than the distance threshold into a long distance group. It should be noted that, in the example shown in FIG. 3, the Monday division, Tuesday division, Wednesday division, Thursday division and Friday division are classified into a short distance group, and the Saturday division and Sunday division are classified into a long distance group.

Next, in step S14, the target setting unit 15 creates the charging plan based on the movement pattern database after updated, and then advance to step S3.

Figure 4:
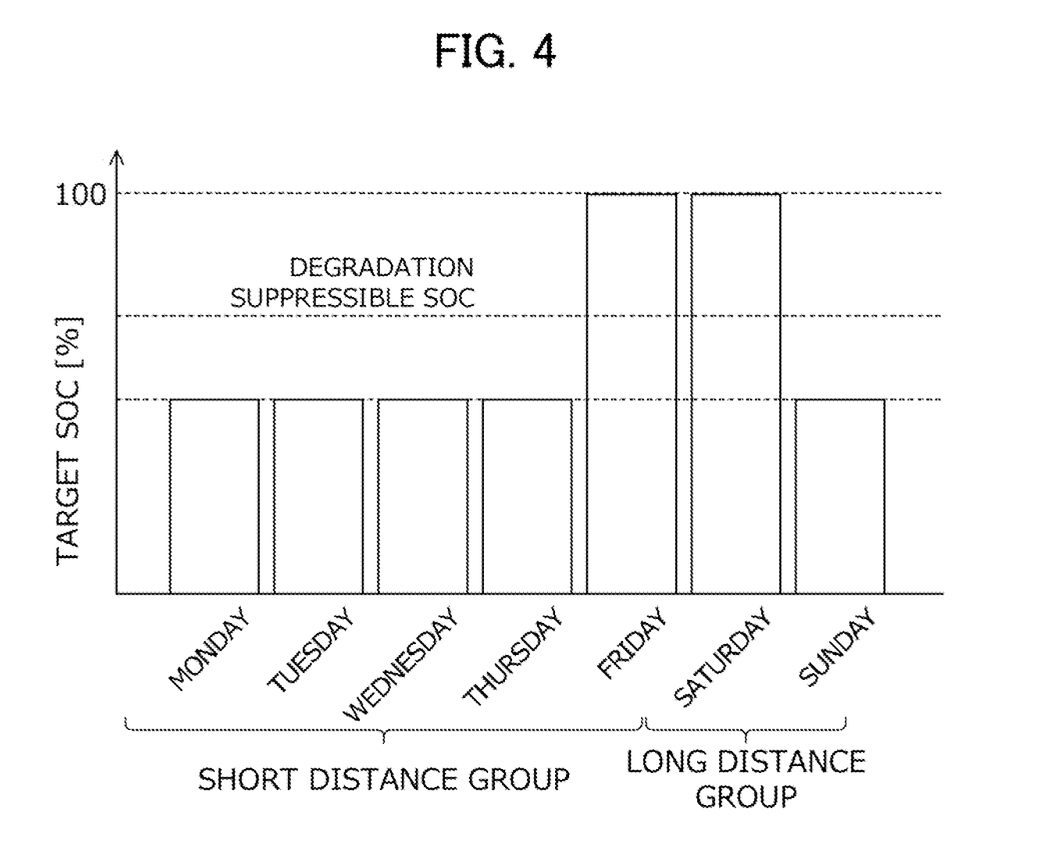
FIG. 4 is a view showing an example of a charging plan created based on the movement pattern shown in FIG. 3.

FIG. 4 is a view showing an example of a charging plan created based on the movement pattern database show in FIG. 3. The target setting unit 15 sets the target SOC for every day of the week division based on the movement pattern database. More specifically, the target setting unit 15 sets the target SOC to full charge (for example, 100%), in the case of the group to which the day of the week division of the next use predicted day (for example, next day), of the vehicle 3 belongs being the long distance group, i.e. case of long distance travel is supposed as the use predicted day. For this reason, in the case of the Saturday division and Sunday division being classified in to the long distance group as shown in FIG. 3, the target SOC of the Friday division and the Saturday division, which are respectively the day of the week divisions of the prior days, are set to 100%.

In addition, the target setting unit 15, in the case of the group to which the day of the week division of the next use predicted day of the vehicle 3 belongs being the short distance group, i.e. case of the short distance travel being supposed on the use predicted day, sets the target SOC within a range less than a predetermined degradation suppressible SOC. Herein, degradation suppressible SOC corresponds to the upper limit for SOC which can charge the battery 4 without causing degradation.

More specifically, the target setting unit 15, in the case of the group to which the day of week division of the next use predicted day of the vehicle 3 belongs being the short distance group, sets the target SOC within a range less than the degradation suppressible SOC based on the average charge rate decrease amount of the day of week division included in the short distance group. More specifically, the target setting unit 15 sets the target SOC based on the average value for the average charge rate decrease amount of each day of week division included in the short distance group. Herein, the target setting unit 15 sets the target SOC to be smaller as the average value for the average charge rate decrease amount of each day of week division becomes smaller, and set the target SOC to be larger as the average value for the average charge rate decrease amount of each day of week division becomes larger. For this reason, in the case of the Monday to Friday divisions being classified to the short distance group as shown in FIG. 4, the target SOC of the Monday division to Thursday division which are day of week divisions of prior days thereto are set within a range less than the degradation suppressible SOC, based on the average value for the average charge rate decrease amount of each day of week division.

Figure 5:
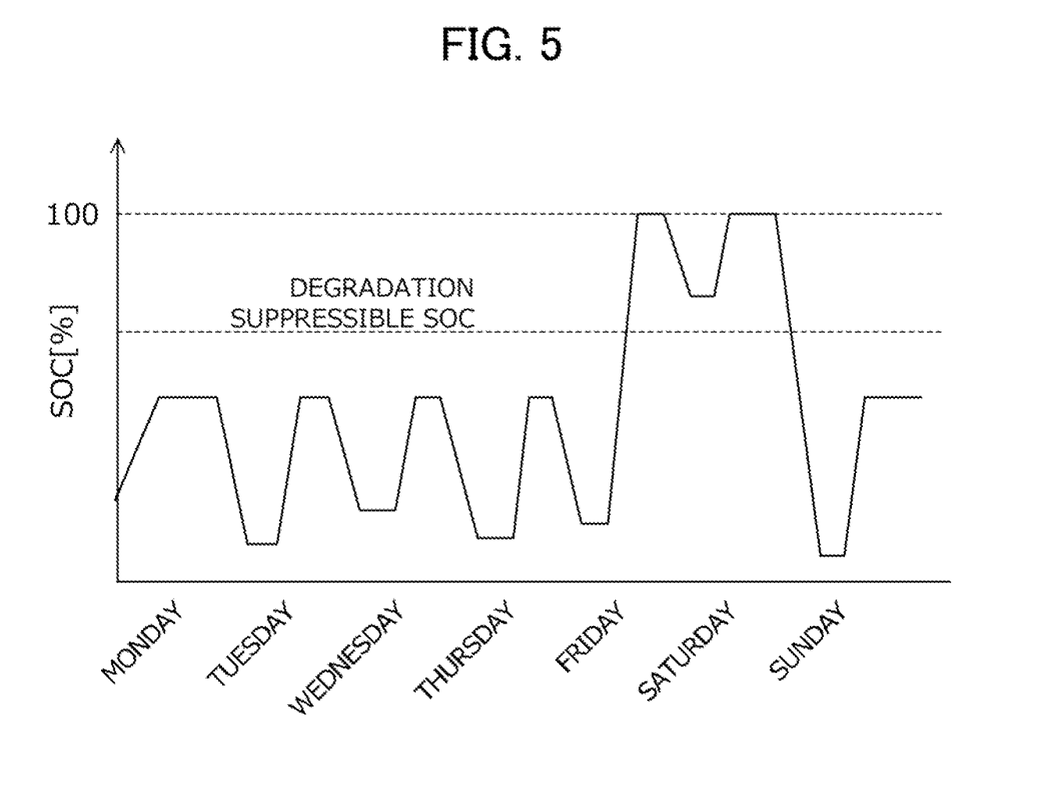
FIG. 5 is a time chart showing the change in SOC of the battery in the case of charging the battery according to the charging plan shown in FIG. 4.

FIG. 5 is a time chart showing the change in SOC of the battery 4 in the case of charging the battery 4 in accordance with the charging plan shown in FIG. 4.

In the charging plan shown in FIG. 4, since it is estimated that the travel distance of the next day thereto is short, from Monday to Thursday, the target SOC during charging by the contactless charging device 2 is set to be lower than the degradation suppressible SOC. In contrast, from Friday to Saturday, since the travel distance of the next day thereto is supposed as being long, the target SOC during charging by the contactless charging device 2 is set to full charge.

According to the contactless charging system 1 of the present embodiment, the following effect are exerted.

(1) The wireless communication device 16 acquires the vehicle travel information and battery use information of the battery 4. It is thereby possible to grasp the usage condition of the vehicle 3 and battery 4 by the user, and movement pattern. In addition, the target setting unit 15 creates the charging plan including the target SOC of the battery 4 based on the information acquired by the wireless communication device 16, and the charge control unit 14 controls sending of electrical power for battery charging based on the target SOC determined by the charging plan. Therefore, according to the contactless charging system 1, since it is possible to charge the battery 4 by the required amount suited to the usage conditions of the vehicle 3 and battery 4 by the user and the movement pattern by setting the target SOC based on the vehicle travel information and battery use information, it can be configured so as to not fully charge the battery 4 unnecessarily. Consequently, according to the contactless charging system 1, it is possible to suppress degradation of battery 4 without causing the convenience of the user to decline.

(2) The target setting unit 15 constructs the movement pattern database of the user by dividing the average charge rate decrease amount calculated based on the average travel distance calculated based on the acquired vehicle travel information and the battery use information, into seven day of week divisions of whole day units, further classifies these day of week divisions into a long distance group and a short distance group based on the average travel distance, and creates a charging plan including the target SOC based on the average charge rate decrease amount included in each group. According to the contactless charging system 1, by classifying the day of week divisions into two groups based on the average travel distance, and then setting the charging plan based on the average charge rate decrease amount included in each group, since it is possible to charge the battery 4 by the required amount suited to the movement pattern of the user, it is configured so as not to fully charge the battery 4 unnecessarily, and it is possible to suppress degradation of the battery 4 without causing the convenience of the user to decline.

(3) The target unit 15 sets the target SOC based on the average charge rate decrease amount included in the group to which the next use predicted day of the vehicle 3 belongs. On the day on which the user actually uses the vehicle 3, since it is thereby possible to charge the battery 4 by an amount required on this day, it can be configured so as not to fully charge the battery 4 unnecessarily, and suppress degradation of the battery 4, without causing the convenience of the user to decline.

(4) The communication terminal 17 acquires the management information of the battery 4 via the network N from the management server 8 managing the usage condition of the battery 3, and the target setting unit 15 creates a charging plan including the target SOC, based on the vehicle travel information, battery use information, and management information of the battery use information, and management information of the battery 4 from the management server 8. Information which cannot be acquired from the use information is included in the management information of battery 4, as in the history related to the charging battery 4 other than at home, for example. Consequently, according to the contactless charging system 1, by setting the target SOC based on these three sets of information, it is possible to accurately grasp the usage condition of the battery 4 of the vehicle 3 by the user and the movement pattern, and thus appropriately set the charging plan. Consequently, according to the contactless charging system 1, it is possible to suppress degradation of the battery 4 without causing the convenience of the user to decline.

Although an embodiment of the present invention has been explained above, the present invention is not to be limited thereto. The configuration of detailed parts may be appropriately modified within a scope of the gist of the present invention.

In other words, the aforementioned embodiment describes a case of providing the target setting unit 15 to the contactless charging device 2; however, the present invention is not to be limited thereto. The target setting unit 15 may be equipped to the vehicle 2. In this case, the target setting unit 15 may send the charging plan to the side of the contactless charging device 2, by data communication between the short range communication device 6 and wireless communication device 16.

In addition, in the aforementioned embodiment, the target setting unit 15, in the case of the group to which the day of week division of the next use predicted day of the vehicle 3 belongs being the long distance group, i.e. case of long distance travel being supposed on the use predicted day, sets the target SOC to full charge; however, the present invention is not to be limited thereto. The user may charge the battery 4 using charging equipment at a remote location. For this reason, in the case of being supposed that there is a tendency for the user to use charging equipment of a remote location to charge the battery 4, based on the battery management information acquired form the management server 8, the target setting unit 15 may expect this and set the target SOC to less than full charge, more preferably to less than the degradation suppressible SOC.

What is claimed is:

1. A contactless charging system which sends electrical power for battery charging by non-contact to charge a battery equipped to a vehicle by way of the electrical power for battery charging, the contactless charging system comprising:
    an information acquirer which acquires travel information of the vehicle and use information of the battery;
    a target configurator which sets a target charge amount of the battery, based on information acquired by the information acquirer; and
    a charge controller which controls sending of the electrical power for battery charging based on the target charge amount,
    wherein the target configurator:
    divides the travel information and the use information into a plurality of divisions of whole day units,
    calculates an average value for per-day travel distance of each day of the week as an average travel distance,
    classifies a day-of-week division having the average travel distance less than a predetermined distance threshold into a short distance group,
    calculates an average value for per-day decrease amount of charge rate of each day of the week as an average charge rate decrease amount, and
    sets the target charge amount to a value within a range of less than a degradation suppressible charge amount corresponding to an upper limit of charge amount that can be charged without degrading the battery and in accordance with an average value for the average charge rate decrease amount over the short distance group, when the day-of-week division of a next use predicted day of the vehicle belongs to the short distance group.

2. The contactless charging system according to claim 1, wherein the information acquirer acquires management information of the battery via a network from a server which manages a usage condition of the battery, and
    wherein the target configurator sets the target charge amount based on the travel information, the use information and the management information.

* * * * *